US012626476B1

(12) United States Patent
Niu et al.

(10) Patent No.: US 12,626,476 B1
(45) Date of Patent: May 12, 2026

(54) SYSTEM TO DETERMINE HUMANS IN A PHYSICAL SPACE

(71) Applicant: AMAZON TECHNOLOGIES, INC., Seattle, WA (US)

(72) Inventors: Boshen Niu, San Mateo, CA (US); Shreekant Gayaka, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 323 days.

(21) Appl. No.: 17/934,035

(22) Filed: Sep. 21, 2022

(51) Int. Cl.
| | |
|---|---|
| *G06V 10/20* | (2022.01) |
| *G01D 21/02* | (2006.01) |
| *G06T 7/60* | (2017.01) |
| *G06V 10/26* | (2022.01) |

(52) U.S. Cl.
CPC .......... *G06V 10/255* (2022.01); *G01D 21/02* (2013.01); *G06T 7/60* (2013.01); *G06V 10/26* (2022.01); *G06V 2201/07* (2022.01)

(58) Field of Classification Search
CPC .. G06V 10/255; G06V 10/26; G06V 2201/07; G01D 21/02; G06T 7/60
See application file for complete search history.

(56) References Cited

U.S. PATENT DOCUMENTS

| | | | | |
|---|---|---|---|---|
| 9,280,710 | B1 * | 3/2016 | Ferguson | ............. G06V 20/582 |
| 11,270,437 | B1 * | 3/2022 | Volta | .................... G06V 10/273 |

| | | | | |
|---|---|---|---|---|
| 2016/0078291 | A1 * | 3/2016 | Kim | ..................... G06V 30/414 |
| | | | | 382/164 |
| 2017/0091948 | A1 * | 3/2017 | Paradkar | ................... G06T 7/73 |
| 2018/0060653 | A1 * | 3/2018 | Zhang | ..................... G06V 20/52 |
| 2020/0342250 | A1 * | 10/2020 | Smirnov | .............. G06V 10/764 |
| 2023/0020725 | A1 * | 1/2023 | Ishii | ......................... G06T 7/194 |
| 2023/0410530 | A1 * | 12/2023 | Taghavi | ................. G01S 17/89 |

* cited by examiner

*Primary Examiner* — Amandeep Saini

*Assistant Examiner* — Emma Rose Goebel

(74) *Attorney, Agent, or Firm* — Lindauer Law, PLLC

(57) ABSTRACT

A physical space includes humans and other objects. Humans may be dynamic in that they move while nonhuman objects may not move over time. An autonomous mobile device (AMD) determines which objects are human or other. Once determined, information about which objects are humans or not is used to provide functions such as facilitating interactions with people, determining accurate occupancy maps that do not incorrectly include the people, and so forth. Objects are represented as clusters, such as a two-dimensional arrangement of squares or a three-dimensional arrangement of cubes. Clusters are processed using one or more classification methods. If the classification indicates a human, one or more extraction techniques may be used to distinguish the portion of the cluster that is associated with the human object and that which is associated with a nonhuman object, such as furniture. The occupancy map, updated with nonhuman objects, may be used for navigation.

20 Claims, 7 Drawing Sheets

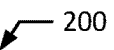

AUTONOMOUS MOBILE DEVICE 104

POWER SUPPLY 202

PROCESSOR(S) 130

MOTOR(S) 132

CLOCK(S) 204

COMMUNICATION
INTERFACE(S)
206

I/O INTERFACE(S)
208

NETWORK INTERFACE(S)
210

I/O DEVICE(S)
212

SENSOR(S) 134

OUTPUT DEVICE(S)
214

MEMORY 140

MAPPING MODULE 142

OPERATING SYSTEM MODULE 216

COMMUNICATION MODULE 218

SAFETY MODULE 220

OBJECT MODULE 152

SPEECH PROCESSING MODULE 222

AUDIO FEATURE VECTOR(S) 224

WAKEWORD DETECTION
MODULE 226

AUDIO DATA 228

AUTONOMOUS NAVIGATION
MODULE 176

TASK MODULE(S) 178

...

OTHER MODULE(S) 234

DATA STORE 280

SAFETY TOLERANCE DATA 236

SENSOR DATA 146

RAW AUDIO DATA 238

POINT CLOUD DATA 148

IMAGE DATA 150

INPUT DATA 240

OCCUPANCY MAP 144

PATH PLAN DATA 248

OBJECT DATA 174

...

OTHER DATA 250

FIG. 2

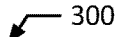
300

NETWORK INTERFACES 210

- WLAN INTERFACE 302
- PAN INTERFACE 304
- SECONDARY RF LINK INTERFACE 306
- ⋮
- OTHER 308

OUTPUT DEVICE(S) 214

- MOTOR 132
- LIGHT 382
- SPEAKER 384
- DISPLAY 386
- PROJECTOR 388
- SCENT DISPENSER 390
- ACTUATOR(S) 392
- ⋮
- OTHER 394

SENSOR(S) 134

- MOTOR ENCODER 310
- SUSPENSION WEIGHT SENSOR 312
- BUMPER SWITCH 314
- FLOOR OPTICAL MOTION SENSOR 316
- ULTRASONIC SENSOR 318
- OPTICAL SENSOR (E.G. ToF) 320
- LIDAR 322
- MAST POSITION SENSOR 324
- MAST STRAIN SENSOR 326

- PAYLOAD WEIGHT SENSOR 328
- TEMPERATURE SENSOR 330
- INTERLOCK SENSOR 332
- GYROSCOPE 334
- ACCELEROMETER 336
- MAGNETOMETER 338
- LOCATION SENSOR 340
- PHOTODETECTOR 342
- CAMERA (E.G. VISIBLE, IR, UV) 344
- MICROPHONE 346

- AIR PRESSURE SENSOR 348
- AIR QUALITY SENSOR 350
- AMBIENT LIGHT SENSOR 352
- AMBIENT TEMPERATURE SENSOR 354
- FLOOR ANALYSIS SENSOR 356
- CASTER ROTATION SENSOR 358
- RADAR 360
- PASSIVE INFRARED SENSOR 362
- ⋮
- OTHER SENSOR 364

FIG. 3

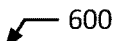

```
┌─────────────────────────────┐
│   DETERMINE A FIRST CLUSTER  │
│            602               │
└─────────────────────────────┘
              │
              ▼
┌─────────────────────────────┐
│ DETERMINE FIRST LOCATION     │
│ INDICATIVE OF A HUMAN,       │
│ WHEREIN THE FIRST LOCATION   │
│ IS WITHIN THE FIRST CLUSTER  │
│            604               │
└─────────────────────────────┘
              │
              ▼
┌─────────────────────────────┐
│ DETERMINE A FIRST AREA THAT  │
│ IS ASSOCIATED WITH THE FIRST │
│ LOCATION                     │
│            606               │
└─────────────────────────────┘
              │
              ▼
┌─────────────────────────────┐
│ DETERMINE A SECOND RATIO     │
│ BASED ON A PORTION OF THE    │
│ FIRST AREA THAT OVERLAPS THE │
│ FIRST CLUSTER                │
│            608               │
└─────────────────────────────┘
```

HUMAN
LOCATION
166

FURNITURE
106

HUMAN
108

FIRST AREA
652

FIRST AREA
652

FIRST
CLUSTER
158

SECOND RATIO ≥ A SECOND THRESHOLD 610

NO

DETERMINE THE FIRST CLUSTER IS ASSOCIATED WITH A CLASSIFICATION VALUE INDICATIVE OF A NONHUMAN OBJECT 614

EXTRACT A CLUSTER ASSOCIATED WITH A HUMAN OBJECT 616

YES

DETERMINE THE FIRST CLUSTER IS ASSOCIATED WITH A CLASSIFICATION VALUE INDICATIVE OF A HUMAN OBJECT 612

FIG. 6

SYSTEM TO DETERMINE HUMANS IN A PHYSICAL SPACE

BACKGROUND

An autonomous mobile device (AMD) moves throughout a physical space and may interact with humans.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 2 is a block diagram of the components of the AMD, according to some implementations.

FIG. 3 is a block diagram of some components of the AMD, such as network interfaces, sensors, and output devices, according to some implementations.

FIG. 6 is a flow diagram of a second implementation of a process for determining classification of an object represented by a cluster.

Figure 1:
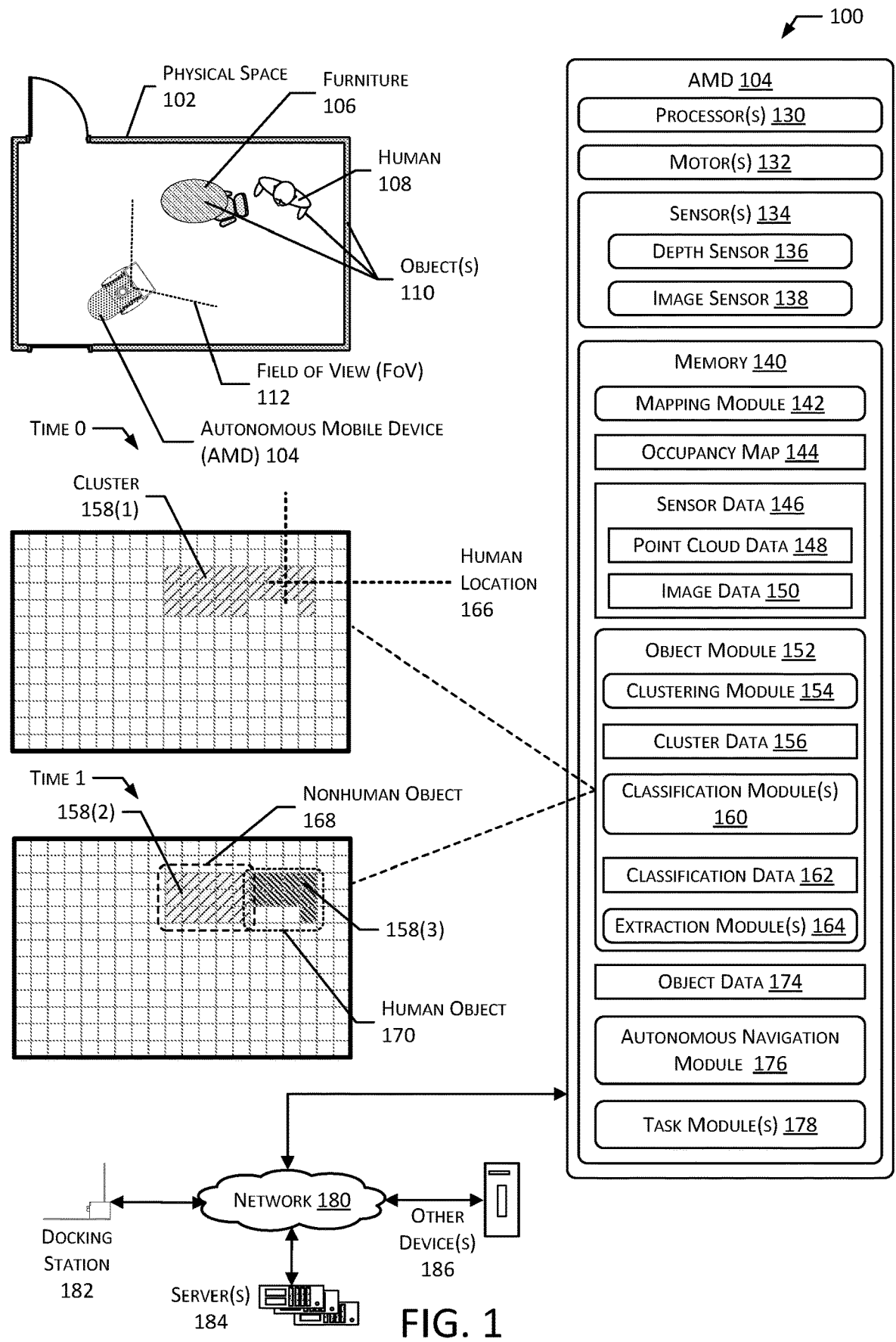
FIG. 1 illustrates a system for an autonomous mobile device (AMD) to determine humans in a physical space, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot operates in a physical space that includes users, such as humans. Operations of the robot may include interacting with humans, moving autonomously between locations in the physical space without being driven or controlled by a user, and so forth.

During operation, the AMD uses sensor data to determine clusters indicative of one or more objects in the physical space. Each cluster represents an area or volume of the physical space that is determined to include an object. For example, a cluster may comprise a plurality of cells, with each cell representing a particular area of the physical space. In another example, a cluster may comprise a plurality of cells in which each cell represents a particular volume of the physical space.

The AMD determines a classification of an object represented by a cluster, such as whether the cluster is representative of a human object or a nonhuman object. Humans may also be designated as dynamic or non-stationary as they may move on their own accord. Nonhumans may also be designated as stationary, as they do not move on their own accord.

The clusters and their associated classification data may be used to determine an occupancy map that represents the location of nonhuman (stationary) objects in the physical space. In one implementation, the occupancy map may be used to determine a path plan between locations in the physical space for autonomous movement. In another implementation, a map may represent the current or previous locations of human objects in the physical space. This map may be used during other operations, such as a search for a specified person.

An incorrect classification of an object may result in the AMD determining an incorrect occupancy map that represents places where humans were detected as obstacles to movement. Over time, successive misclassifications of objects may result in an incorrect occupancy map of a physical space that depicts objects that are not present. While path planning, the more obstacles there are, the more difficult it is to plan a path. As a result, a cluttered occupancy map may slow down or completely prevent autonomous movement.

Described in this disclosure are techniques and systems for classifying an object based on one or more characteristics of a cluster. A cluster may comprise a two-dimensional representation of an object, a two-dimensional (2D) projection of a three-dimensional (3D) object, or a 3D representation of the of the object. A cluster may have one or more characteristics, such as an area, a volume, a particular shape, a geometric center, a farthest point on a boundary of the shape, and so forth. For example, the area of the cluster may comprise a sum of the areas of the cells that the cluster consists of. In some implementations, the one or more characteristics may include other information, such as semantic segmentation data that includes information as to whether particular cells in the cluster have been determined to be associated with a human or a nonhuman. One or more of the techniques may be used. For example, output from one or more of a first technique, second technique, or third technique may be combined and used to determine the classification data.

The systems and techniques described in this disclosure are computationally efficient and operate with low latency. They may be used on a device with resource constraints, such as an AMD. The low latency facilitates usage in situations, such as classifying an object while the AMD is in motion. The systems and techniques in this disclosure are able to operate and provide accurate classification data in a variety of different situations. As a result, the high accuracy of the classification data facilitates improved operation of the AMD.

Illustrative System

FIG. 1 illustrates a system 100 in a physical space 102 with an autonomous mobile device (AMD) 104 using sensor data to determine a classification of an object, according to some implementations. The AMD 104 is shown in a physical space 102 that includes objects 110 such as furniture 106, a human 108, walls, stairs, stair wells, doors, and so forth.

The AMD 104 includes one or more hardware processors 130 (processors) to execute one or more stored instructions. The processors 130 may comprise one or more cores. The processors 130 may include microcontrollers, systems on a chip, field programmable gate arrays, digital signal processors, graphic processing units, general processing units, and so forth.

The AMD 104 includes one or more motors 132 or other actuators to enable the AMD 104 to move from one location in the physical space 102 to another. For example, a motor 132 may be used to drive a wheel attached to a chassis of the AMD 104, which causes the AMD 104 to move. The AMD 104 may turn, move forward, move backward, and so forth. In another example, actuators may move legs allowing the AMD 104 to walk.

The AMD 104 also includes one or more sensors 134 and memory 140. The one or more sensors 134 may include a depth sensor 136, image sensor 138, and so forth. During operation, the sensors 134 acquire sensor data 146.

The depth sensors 136 may determine point cloud data 148 about the presence or absence of objects 110 in the physical space 102, and so forth. For example, the depth sensors 136 may comprise a time-of-flight (TOF) depth camera, ultrasound, radar, LIDAR, stereocamera, and so forth. The point cloud data 148 is indicative of whether an object is detected or not, and also includes information about the distance between the depth sensor 136 and the object and relative direction with respect to the depth sensor 136 of an object, if detected. An individual point in the point cloud data 148 is a three-dimensional coordinate representative of a location where the depth sensor 136 detected a portion of an object 110 in the physical space 102. Point cloud data 148 may comprise a plurality of coordinate points indicative of one or more objects 110 within the physical space 102. Each individual coordinate point of the plurality of coordinate points may indicate an individual three-dimensional coordinate. The point cloud data 148 may be used to determine locations and dimensions of objects 110 in the physical space 102.

The image sensor 138 may acquire image data 150. For example, the image sensor 138 may comprise a monovision camera, stereovision camera, or other imaging device. The image data 150 is representative of at least a portion of the physical space 102. The image data 150 may be used to determine locations and characteristics of objects 110 in the physical space 102.

The sensors 134 are discussed in more detail with regard to FIG. 3.

The one or more sensors 134 may have different fields of view (FOV) 112. For example, a depth sensor 136 may have a first field of view and an image sensor 138 may have a second field of view. A FOV 112 is the extent of the physical space 102 represented by sensor data 146 acquired using one or more sensors 134.

As the AMD 104 operates in the physical space 102, a mapping module 142 may determine an occupancy map 144 of the physical space 102. For example, the mapping module 142 may use information based on the sensor data 146, output from the object module 152, and so forth to determine the occupancy map 144.

The occupancy map 144 may represent dimensions of the physical space 102 and of the objects 110 within the physical space 102. For example, the occupancy map 144 may comprise data that indicates the location of one or more nonhuman stationary objects 110. In some implementations, a human map may be determined that represents locations with respect to the physical space 102 of objects 110 that have been classified as being human 108.

In some implementations, the occupancy map 144 may comprise a plurality of cells with each cell of the plurality of cells representing a particular area in the physical space 102. Data, such as occupancy values, may be stored that indicates whether an area of the physical space 102 associated with the cell is unobserved, occupied by an object, or is unoccupied.

An object 110 may comprise a physical obstacle or feature that prevents or impairs traversal by the AMD 104. For example, an object 110 may comprise a wall, stairwell, human 108, pet, and so forth. The occupancy map 144 or other data associated with a map may be implemented using a variety of different data structures. For example, data indicated by a map may be managed by one or more arrays, one or more database records, one or more lists, one or more data objects, one or more graphs, and so forth.

An object module 152 accepts as input at least a portion of the sensor data 146 and provides as output object data 174. The object module 152 may comprise a clustering module 154, one or more classification modules 160, one or more extraction modules 164, and so forth.

The clustering module 154 accepts sensor data 146 as input and determines cluster data 156 indicative of clusters 158 of cells that are deemed to be associated with a single object 110. In some implementations, a cluster 158 may comprise a plurality of cells that are one or more of: adjacent to, or within a threshold distance of, one another. In some implementations, the threshold distance may be determined based on noise associated with the sensor data 146. For example, if the sensor data 146 results in uncertainty with regard to a location in the physical space of 5 cm, and the cell size is 5 cm, the threshold distance may be two cells or 10 cm. In another implementation a cluster 158 may comprise a plurality of cells that are contiguous with one another. In some implementations, the clustering module 154 may limit the size of a cluster 158. For example, the cluster 158 may be limited to a maximum of 2 meters in a longest dimension.

In this illustration, at time=0 a map is shown depicting a first cluster 158(1). Also depicted is a human location 166. In some implementations, a module may process at least a portion of the sensor data 146 and determine a human location 166 that is indicative of a location in the physical space 102 where a human 108 has been detected. For example, the image data 150 may be processed using a face detection module, human detection module, and so forth, and may determine the human location 166.

Figure 4:
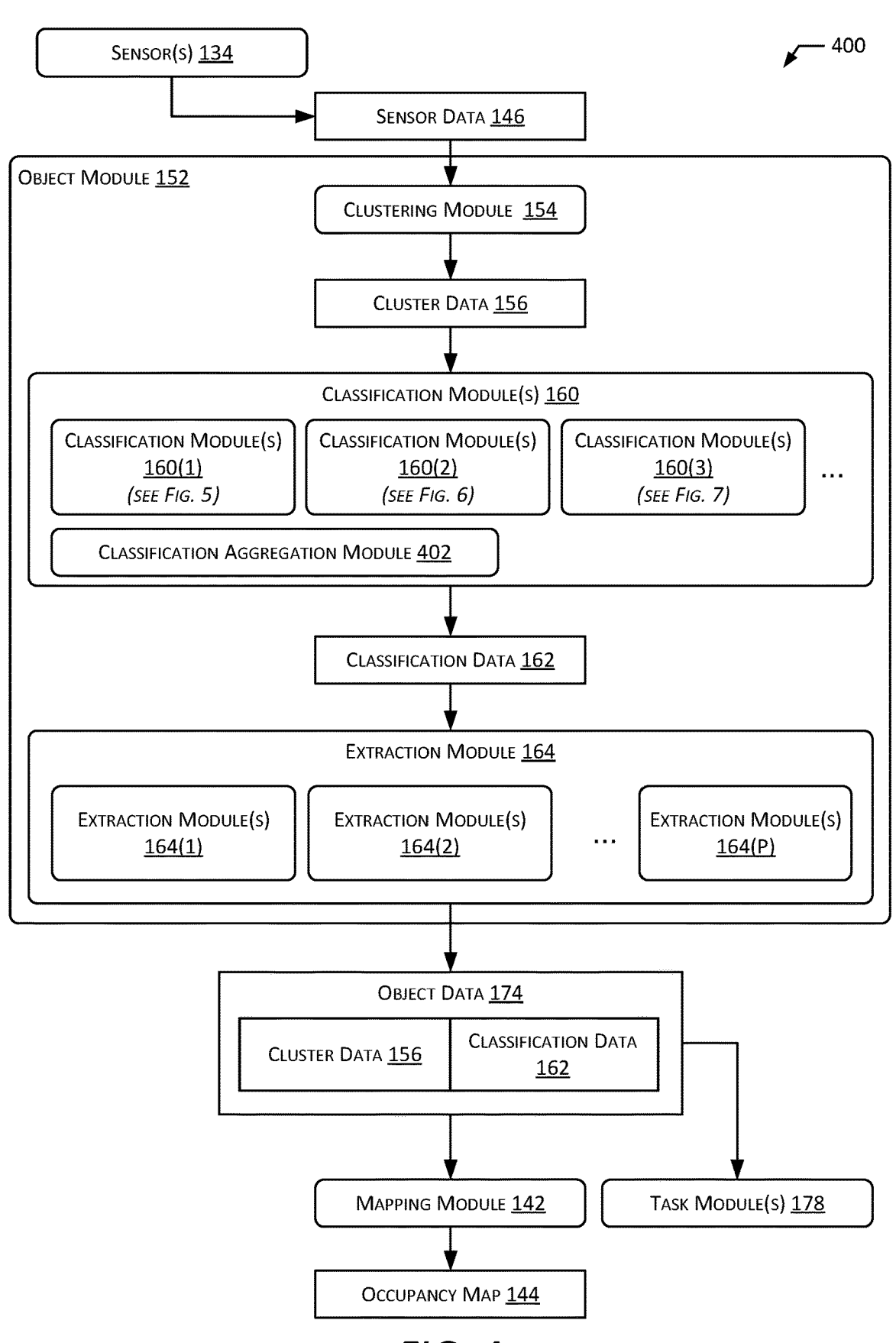
FIG. 4 is a block diagram of an object module to determine object classification such as human and nonhuman, according to some implementations.

Operation of the clustering module 154 is discussed in more detail with regard to FIG. 4.

The classification module 160 accepts the cluster data 156 as input and determines classification data 162. The classification data 162 is indicative of a class of the object associated with the cluster 158. For example, the classification data 162 may indicate that a particular cluster 158 is associated with a class of "human" or "nonhuman". In some implementations, the classification of "nonhuman" may be indicative of a cluster 158 that may include a human 108 plus some other object, such as furniture 106. An extraction module 164 may be used to determine which portion of the "nonhuman" cluster 158 is associated with a human 108 and which is another object such as furniture 106. In some implementations, the classification module 160 may determine the object data 174. In other implementations, additional processing may be performed by the extraction module 164 to determine the object data 174. Operation of the classification module 160 is discussed in more detail with regard to FIGS. 4-7.

The extraction module 164 may accept as input one or more of the classification data 162 or the cluster data 156 and determine as output the object data 174. For example, the extraction module 164 may divide a first cluster 158(1) into a second cluster 158(2) and a third cluster 158(3). The second cluster 158(2) may have classification data 162(1) indicative of a first classification such as "nonhuman" while the third cluster 158(3) may have classification data 162(2) indicative of a second classification such as "human".

In this illustration, at time=1 the map is shown depicting after the first cluster 158(1) has been extracted to determine a second cluster 158(2) and a third cluster 158(3). These clusters 158(2)-(3) may be processed using the classification modules 160 to determine the classification data 162. For example, the second cluster 158(2) has been determined to be a nonhuman object 168 while the third cluster 158(3) has been determined to be a human object 170.

The extraction module 164 is discussed in more detail with regard to FIG. 4.

The object data 174 may comprise information that is indicative of classification of an object, and the location of the object 110 with respect to the physical space 102. For example, the object data 174 may be indicative of the determined classification and cluster data 158 that is indicative of a particular portion of the physical space 102. The object data 174 is discussed in more detail with regard to FIG. 4.

The object data 174 may be provided as input to one or more of the mapping module 142, an autonomous navigation module 176, a task module 178, and so forth. For example, the mapping module 142 may use the object data 174 to determine the occupancy map 144. The autonomous navigation module 176 may then use the occupancy map 144 to determine a path plan for autonomous movement. In another example, the task module 178 may use information about where humans 108 are located to perform one or more tasks, such as a sentry task, finding a particular person, and so forth.

The autonomous navigation module 176 provides the AMD 104 with the ability to navigate within the physical space 102 without real-time human interaction. The autonomous navigation module 176 may generate path plan data that is indicative of a path through the physical space 102 from the current location to a destination location. The AMD 104 may then begin moving along the path.

The autonomous navigation module 176 may implement, or operate in conjunction with, the mapping module 142 to determine the occupancy map 144. For example, simultaneous localization and mapping (SLAM) techniques may be used to determine where the AMD 104 is in the physical space 102. Based on this information, information about the FOV of the sensors 134, and the sensor data 146, the mapping module 142 may determine the occupancy map 144.

The AMD 104 may include one or more task modules 178 stored in the memory 140. The task modules 178 may provide various functionality, such as a sentry task module to determine if an unauthorized human 108 is present, a videoconferencing task module to allow the human 108 to communicate with another party using the AMD 104, and so forth.

A command to move may be the result of input from a human 108, a previously scheduled task, a response to input from one or more sensors 134, a command from an external computing device, or another source.

Modules described herein, such as the mapping module 142, may provide various processing functions such as de-noising, filtering, and so forth. Processing of sensor data 146, such as image data 150 from a camera, may be performed by a module implementing, at least in part, one or more of the following tools or techniques. In one implementation, processing of image data 150 may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 146. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 146 or other data.

The AMD 104 may use network interfaces to connect to a network 180. For example, the network 180 may comprise a wireless local area network, that in turn is connected to a wide area network such as the Internet.

The AMD 104 may be configured to dock or connect to a docking station 182. The docking station 182 may provide external power which the AMD 104 may use to charge a power supply of the AMD 104. The docking station 182 may also be connected to the network 180. For example, the docking station 182 may be configured to connect to the wireless local area network 180 such that the docking station 182 and the AMD 104 may communicate.

The AMD 104 may access one or more servers 184 via the network 180. For example, the AMD 104 may utilize a wakeword detection module to determine if the human 108 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the human 108 to one or more servers 184 for further processing. The servers 184 may process the spoken audio and return to the AMD 104 data that may be subsequently used to operate the AMD 104.

The AMD 104 may also communicate with other devices 186. The other devices 186 may include one or more devices that are within the physical space 102 such as a home or associated with operation of one or more devices in the physical space 102. For example, the other devices 186 may include a doorbell camera, a garage door opener, a refrigerator, washing machine, and so forth. In some implementations the other devices 186 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

FIG. 2 is a block diagram 200 of the AMD 104, according to some implementations.

The AMD 104 may include a power supply 202 to provide electrical power suitable for operating the components in the AMD 104. In some implementations the power supply 202 may comprise a battery, a wireless power transfer, capacitors, fuel cells, storage flywheels, and so forth.

The AMD 104 includes one or more motors 132 or other actuators to enable the AMD 104 to move from one location in the physical space 102 to another. For example, a motor 132 may be used to drive a wheel attached to a chassis of the AMD 104, which causes the AMD 104 to move. The AMD 104 may turn, move forward, move backward, and so forth. In another example, actuators may move legs allowing the AMD 104 to walk.

The AMD 104 may include one or more hardware processors 130 (processors) configured to execute one or more stored instructions. The processors 130 may comprise one or more cores. The processors 130 may include microcontrollers, systems on a chip, field programmable gate arrays, digital signal processors, graphic processing units, general processing units, and so forth.

One or more clocks 204 may provide information indicative of date, time, ticks, and so forth. For example, the processor 130 may use data from the clock 204 to associate a particular time with an action, sensor data 146, and so forth.

The AMD 104 may include one or more communication interfaces 206 such as input/output (I/O) interfaces 208, network interfaces 210, and so forth. The communication interfaces 206 enable the AMD 104, or components thereof, to communicate with other devices 186 or components. The communication interfaces 206 may include one or more I/O interfaces 208. The I/O interfaces 208 may comprise Inter-Integrated Circuit (I2C), Serial Peripheral Interface bus (SPI), Universal Serial Bus (USB) as promulgated by the USB Implementers Forum, RS-232, and so forth.

The network interfaces 210 may be configured to provide communications between the AMD 104 and other devices 186 such as other AMDs 104, docking stations 182, routers, access points, and so forth. The network interfaces 210 may include devices configured to couple to personal area networks (PANs), local area networks (LANs), wireless local area networks (WLANS), wide area networks (WANs), and so forth. For example, the network interfaces 210 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

The I/O interface(s) 208 may couple to one or more I/O device 212. The I/O device 212 may include input devices such as one or more of a sensor 134, keyboard, mouse, scanner, and so forth. The I/O device 212 may also include output devices 214 such as one or more of a motor 132, light, speaker, display, projector, printer, and so forth. In some embodiments, the I/O devices 212 may be physically incorporated with the AMD 104 or may be externally placed.

As shown in FIG. 2, the AMD 104 includes one or more memories 140. The memory 140 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 140 provides storage of computer-readable instructions, data structures, program modules, and other data for the operation of the AMD 104. A few example functional modules are shown stored in the memory 140, although the same functionality may alternatively be implemented in hardware, firmware, or as a system on a chip (SoC).

The memory 140 may include at least one operating system (OS) module 216. The OS module 216 is configured to manage hardware resource devices such as the I/O interfaces 208, the I/O device 212, the communication interfaces 206, and provide various services to applications or modules executing on the processors 130. The OS module 216 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 140 may be a data store 280 and one or more of the following modules. These modules may be executed as foreground applications, background tasks, daemons, and so forth. The data store 280 may use a flat file, database, linked list, tree, executable code, script, or other data structure to store information. In some implementations, the data store 280 or a portion of the memory 140 may be distributed across one or more other devices 186 including other AMDs 104, servers 184, network attached storage devices, and so forth.

A communication module 218 may be configured to establish communication with other devices 186, such as other AMDs 104, an external server 184, a docking station 182, and so forth. The communications may be authenticated, encrypted, and so forth.

Other modules within the memory 140 may include a safety module 220, the mapping module 142, the object module 152, the autonomous navigation module 176, the one or more task modules 178, a speech processing module 222, or other modules 234. The modules may access memory within the data store 280, including safety tolerance data 236, sensor data 146, other data 250, and so forth.

The safety module 220 may access the safety tolerance data 236 to determine within what tolerances the AMD 104 may operate safely within the physical space 102. For example, the safety module 220 may be configured to stop the AMD 104 from moving when an extensible mast of the AMD 104 is extended. In another example, the safety tolerance data 236 may specify a minimum sound threshold which, when exceeded, stops all movement of the AMD 104. Continuing this example, detection of sound such as a human yell would stop the AMD 104. In another example, the safety module 220 may access safety tolerance data 236 that specifies a minimum distance from an object that the AMD 104 is to maintain. Continuing this example, when a sensor 134 detects an object has approached to less than or equal to the minimum distance, all movement of the AMD 104 may be stopped. Movement of the AMD 104 may be stopped by one or more of inhibiting operations of one or more of the motors 132, issuing a command to stop motor operation, disconnecting power from one or more the motors 132, and so forth. The safety module 220 may be implemented as hardware, software, or a combination thereof.

The safety module 220 may control other factors, such as a maximum speed of the AMD 104 based on information obtained by the sensors 134, precision and accuracy of the sensor data 146, and so forth. For example, detection of an object by an optical sensor may include some error, such as when the distance to an object comprises a weighted average between the object and a background. As a result, the maximum speed permitted by the safety module 220 may be based on one or more factors such as the weight of the AMD

104, nature of the floor, distance to the object, and so forth. In the event that the maximum permissible speed differs from the maximum speed permitted by the safety module 220, the lesser speed may be utilized.

The speech processing module 222 may be used to process utterances of the human 108. Microphones may acquire audio in the presence of the AMD 104 and may send raw audio data 238 to an acoustic front end (AFE). The AFE may transform the raw audio data 238 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 238. The AFE may also perform acoustic echo cancellation (AEC) or other operations to account for output audio data that may be sent to a speaker of the AMD 104 for output. For example, the AMD 104 may be playing music or other audio that is being received from a network 180 in the form of output audio data. To avoid the output audio interfering with the device's ability to detect and process input audio, the AFE or other component may perform echo cancellation to remove the output audio data from the input raw audio data 238, or other operations.

The AFE may divide the raw audio data 238 into frames representing time intervals for which the AFE determines a number of values (i.e., features) representing qualities of the raw audio data 238, along with a set of those values (i.e., a feature vector or audio feature vector 224) representing features/qualities of the raw audio data 238 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 238, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 238) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a human intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 238 or the audio feature vectors 224) to one or more server(s) 184 for speech processing. The audio data 228 corresponding to audio obtained by the microphone may be processed locally on one or more of the processors 130, sent to a server 184 for routing to a recipient device or may be sent to the server 184 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the speech processing module 222, prior to sending to the server 184, and so forth.

The speech processing module 222 may include or access an automated speech recognition (ASR) module. The ASR module may accept as input raw audio data 238, audio feature vectors 224, or other sensor data 146 and so forth and may produce as output input data 240 comprising a text string or other data representation. The input data 240 comprising the text string or other data representation may be processed by the autonomous navigation module 176 to determine the command to be executed. For example, the utterance of the command "robot, come here" may result in input data 240 comprising the text string "come here". The wakeword "robot" may be omitted from the input data 240.

The mapping module 142 may use one or more simultaneous localization and mapping ("SLAM") techniques. The SLAM algorithms may utilize one or more of maps, algorithms, beacons, or other techniques to navigate. The autonomous navigation module 176 may use the occupancy map 144 to determine a set of possible paths along which the AMD 104 may move. One of these may be selected and used to determine path plan data 248 indicative of a path. For example, a possible path that is the shortest or has the fewest turns may be selected and used to determine the path. The path is then subsequently used to determine a set of commands that drive the motors 132 connected to the wheels. For example, the autonomous navigation module 176 may determine the current location within the physical space 102 and determine path plan data 248 that describes the path to a destination location such as the docking station 182.

The object module 152 determines the object data 174.

The autonomous navigation module 176 may utilize various techniques during processing of sensor data 146. For example, image data 150 obtained from cameras on the AMD 104 may be processed to determine one or more of corners, edges, planes, and so forth. In some implementations, corners may be detected, and the coordinates of those corners may be used to produce point cloud data 148. This point cloud data 148 may then be used for SLAM or other purposes associated with mapping, navigation, and so forth.

The memory 140 may also include one or more task modules 178.

The AMD 104 may move responsive to a determination made by an onboard processor 130, in response to a command received from one or more communication interfaces 206, as determined from the sensor data 146, and so forth. For example, an external server 184 may send a command that is received using the network interface 210. This command may direct the AMD 104 to proceed to find a particular human 108, follow a particular human 108, and so forth. The AMD 104 may then process this command and use the autonomous navigation module 176 to determine the directions and distances associated with carrying out the command. For example, the command to "come here" may result in the task module 178 sending a command to the autonomous navigation module 176 to move the AMD 104 to a particular location near the human 108 and orient the AMD 104 in a particular direction.

The AMD 104 may connect to the network 180 using one or more of the network interfaces 210. In some implementations, one or more of the modules or other functions described here may execute on the processors 130 of the AMD 104, on the server 184, or a combination thereof. For example, one or more servers 184 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to human speech. For example, the speech synthesis module may be used by the AMD 104 to provide speech that a human 108 is able to understand.

The data store 280 may store the other data 250 as well. For example, localization settings may indicate local preferences such as language, user identifier data may be stored that allows for identification of a particular human, and so forth.

FIG. 3 is a block diagram 300 of some components of the AMD 104 such as network interfaces 210, sensors 134, and output devices 214, according to some implementations. The components illustrated here are provided by way of illustration and not necessarily as a limitation. For example, the AMD 104 may utilize a subset of the particular network interfaces 210, output devices 214, or sensors 134 depicted here, or may utilize components not pictured. One or more of the sensors 134, output devices 214, or a combination thereof may be included on a moveable component that may be panned, tilted, rotated, or any combination thereof with respect to a chassis of the AMD 104.

The network interfaces 210 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHZ and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 186 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 182, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 5G, 6G, LTE, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

A motor encoder 310 provides information indicative of the rotation or linear extension of a motor 132. The motor 132 may comprise a rotary motor, or a linear actuator. In some implementations, the motor encoder 310 may comprise a separate assembly such as a photodiode and encoder wheel that is affixed to the motor 132. In other implementations, the motor encoder 310 may comprise circuitry configured to drive the motor 132. For example, the autonomous navigation module 176 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 220 may use data from the suspension weight sensor 312 to determine whether or not to inhibit operation of one or more of the motors 132. For example, if the suspension weight sensor 312 indicates no weight on the suspension, the implication is that the AMD 104 is no longer resting on its wheels, and thus operation of the motors 132 may be inhibited. In another example, if the suspension weight sensor 312 indicates weight that exceeds a threshold value, the implication is that something heavy is resting on the AMD 104 and thus operation of the motors 132 may be inhibited. For example, the threshold value may comprise a weight of a load that compresses a suspension system to a minimum height, or results in a mass that exceeds a torque output of the motors 132 to maintain a minimum acceleration.

One or more bumper switches 314 provide an indication of physical contact between a bumper or other member that is in mechanical contact with the bumper switch 314. The safety module 220 utilizes sensor data 146 obtained by the bumper switches 314 to modify the operation of the AMD 104. For example, if the bumper switch 314 associated with a front of the AMD 104 is triggered, the safety module 220 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 134 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 146 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) 112 that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 134 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 220 and the autonomous navigation module 176 may utilize the sensor data 146 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects 110 within the scene. Based on the time-of-flight distance to that particular point, sensor data 146 may be generated that is indicative of the presence of objects 110 and the relative positions, shapes, and so forth that are visible to the lidar 322. Data from the lidar 322 may be used by various modules. For example, the autonomous navigation module 176 may utilize point cloud data 148 generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 220. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 220 may utilize sensor data 146 obtained by the mast strain sensor 326. For example, if the strain applied to the mast exceeds a threshold amount, the safety module 220 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 220 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries, one or more motors 132, and so forth. In the event the temperature exceeds a threshold value, the component associated with that device temperature sensor 330 may be shut down. For example, the threshold value may be determined based on component specifications, such as a maximum permissible temperature of the batteries.

One or more interlock sensors 332 may provide data to the safety module 220 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 146 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 146 indicative of impinging light. For example, the photodetector 342 may provide data indicative of a color, intensity, duration, and so forth.

A camera 344 generates sensor data 146 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 146 comprising images being sent to the autonomous navigation module 176. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 176 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from humans 108, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 220, the autonomous navigation module 176, the task module 178, and so forth. For example, if the floor analysis sensor 356 determines that the floor is wet, the safety module 220 may decrease the speed of the AMD 104 and generate a notification alerting the human 108.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 134 may include a radar 360. The radar 360 may be used to provide information as to a distance, lateral position, and so forth, to an object.

The sensors 134 may include a passive infrared (PIR) sensor 362. The PIR sensor 362 may be used to detect the presence of humans 108, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 176. One or more touch sensors may be utilized to determine contact with a human 108 or other objects.

The AMD 104 may include one or more output devices 214. A motor 132 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the human 108. Continuing the example, a motor 132 with an eccentric weight may be used to create a buzz or vibration to allow the AMD 104 to simulate the purr of a cat.

FIG. 4 is a block diagram 400 of the object module 152 to determine object classification such as human and nonhuman, according to some implementations. The object module 152 may be implemented by one or more of the AMD 104, the docking station 182, the servers 184, or other devices 186.

One or more sensors 134 acquire sensor data 146. For example, the depth sensor 136 may acquire point cloud data 148, the image sensor 138 may acquire image data 150, the ultrasonic sensor 318 may provide ultrasonic data, and so forth.

The clustering module 154 accepts at least a portion of the sensor data 146 as input and determines cluster data 156 indicative of clusters 158 of cells or cubes that are deemed to be associated with or contain a single object. In implementations using area, such as a 2D map, the cells represent an area indicated by the map that corresponds to an area in the physical space 102. In implementations using volume, such as a 3D map, the cubes represent a volume indicated by the map that corresponds to a volume in the physical space 102. While cells and cubes are described, it is understood that other space filling polygons or solids may be used. For example, instead of square cells the physical space 102 may be represented as tessellated triangles, rectangular cuboids may be used instead of cubes, and so forth.

In some implementations, a cluster 158 may comprise a plurality of occupied cells that are one or more of: adjacent to, or within a threshold distance of, one another. For example, the cluster module 154 may determine a cluster 158 as all cells or cubes that are immediately adjacent to one another. In another example, a cluster 158 may comprise a plurality of cells that are contiguous with one another. In yet another example, the cluster module 154 may determine a cluster 158 as all cells or cubes that are proximate to one another and are less than a threshold distance, such as two cells. In some implementations, the clustering module 154 may omit information about particular objects 110 in the physical space 102, such as the floor. The clustering module 154 may also limit a cluster 158 to a maximum size, maximum area, span, width, distance between most separated points, and so forth. For example, the cluster module 154 may deem adjacent occupied cells as part of the same cluster 158, up to a maximum cluster having a distance from left to right (relative to the AMD 104) of 2 meters.

In some implementations one or more portions of the cluster 158 may be inferred. For example, the back or side of the object that is opposite to the AMD 104 and its sensors 134 may be unseen. The clustering module 154 may use one or more techniques to determine a boundary of the unseen portion of the cluster 158. For example, the clustering module 154 may assume a straight line in a 2D representation or a flat plane in a 3D representation that connects the visible or "seen" portions of the object.

The cluster data 156 comprises information that is indicative of the cluster 158. The cluster data 156 may be indicative of one or more of a size, shape, boundary, dimensions, orientation, coordinates in the physical space 102 with respect to a reference datum, and so forth. For example, the cluster data 156 may represent the cluster 158 comprising a plurality of cells or cubes, location within the physical space 102, and so forth.

In an ideal situation, each cluster 158 corresponds to a separate object. However, in some situations a cluster 158 may comprise two or more objects 110. For example, a human 108 may be standing close to a piece of furniture 106, resulting in a cluster 158 that includes both. As in this example, two or more objects 110 in a cluster 158 may have different classifications. The extraction modules 164 discussed below may be used to separate a cluster 158 into other clusters 158, each having a particular classification.

In some implementations, the clustering module 154 or other modules may align the sensor data 146, such that sensor data 146 from different sensors 134 is associated with a particular portion of the physical space 102. For example, the point cloud data 148 and the image data 150 are aligned when the data corresponds to the same cell representing a particular area of the physical space 102, or a particular cube representing a particular volume in the physical space 102.

The classification module 160 accepts the cluster data 156 as input and determines classification data 162. Classification data 162 may be determined for individual ones of the clusters 158 represented in the cluster data 156.

The classification data 162 is indicative of a class of the object associated with the cluster 158. For example, the classification data 162 may indicate that a particular cluster 158 is associated with a class of "human" or "nonhuman". In some implementations the classification of "nonhuman" may be indicative of a cluster 158 that may include a human 108 plus some other object, such as furniture 106. As described below, the extraction module 164 may be used to determine which portion of the "nonhuman" cluster 158 is associated with a human 108 and which is another object such as furniture 106.

The classification data 162 may include, or be associated with, the cluster data 156. For example, the classification data 162 may indicate cluster 158(1) has been determined to have object classification of {nonhuman} while cluster 158(2) has been determined to have object classification of {human}.

The classification module 160 may utilize one or more classification modules 160(1)-(N), each implementing a different technique for classifying the cluster 158 based on the cluster data 156. A first technique associated with a first classification module 160(1) is discussed with regard to FIG. 5. A second technique associated with a second classification module 160(2) is discussed with regard to FIG. 6. A third technique associated with a third classification module 160(3) is discussed with regard to FIG. 7. Other techniques may also be used. For example, other classification techniques may use one or more of an aspect ratio of the shape of the cluster 158, a velocity of the cluster 158, and so forth.

In some implementations, a plurality of classification modules 160 may be used to determine the classification data 162. For example, each of the plurality of classification modules 160 may provide preliminary classification data that is accepted as input by a classification aggregation module 402. The classification aggregation module 402 may then use the preliminary classification data to determine the classification data 162. The classification aggregation module 402 may use various algorithms to determine the output such as consensus, logical "and", logical "or", a weighted value, and so forth. For example, the weight value may be determined by multiplying output from respective classification modules 160 by a specified weight value, and summing the resulting products of the multiplication.

In another implementation, the classification aggregation module 402 may comprise a trained machine learning system. For example, the machine learning system may be trained to accept input from a plurality of classification modules 160 and determine as output the classification data 162.

The classification data 162 may be used to determine the object data 174, or may be further processed by one or more extraction modules 164. For example, if the classification data 162 is indicative of the cluster 158 being classified as {human} object, the object module 152 may determine as output object data 174 that is indicative of the cluster data 156 and the classification data 162.

In some situations, two objects 110 may be present within a single cluster 158. In these situations, the classification data 162 may indicate that this cluster 158 is classified as {nonhuman}. In some implementations, the object module 152 may use one or more extraction modules 164 to further process the cluster data 156 to separate these objects 110 into separate clusters 158. These separate clusters 158 may then be classified, such as by the classification modules 160.

A first extraction module 164(1) may utilize a probabilistic approach to determine if a portion of a cluster 158, such as a cell or cube, is stationary. If the same cell or cube is determined to be occupied by an object over successive observation times, as the number of observations increases, the probability that the cell or cube includes a stationary object also increases. For example, furniture 106 such as a table is stationary, and over several seconds or minutes, remains in the same location. As a result, the probability that the cluster 158 contains a stationary, nonhuman object 168 increases. Similarly, humans 108 may move about the physical space 102. A threshold probability may be specified and individual cell or cube probability values may be compared to the threshold probability to determine if a cell or cube is stationary and thus nonhuman or dynamic and thus potentially human.

Individual cells or cubes of the first cluster 158(1) may be assessed and classified based on this comparison to determine additional clusters 158. For example, the cells or cubes that have a probability value less than the threshold probability may be deemed to contain a human 108 and may be designated as a second cluster 158(2). Continuing the example, cells or cubes that have a probability value greater than the threshold probability may be deemed to contain a nonhuman and may be designated as a third cluster 158(3). In some implementations, the clustering module 154 may be utilized to process this data and determine the second cluster 158(2), third cluster 158(3), and so forth. For example, the first cluster 158(1) may encompass a first human 108, a table, and a second human 108. Based on the probability values for the respective cells or cubes and the clustering module 154, a second cluster 158(2) representing the first human 108, a third cluster 158(3) representing the table, and a fourth cluster 158(4) representing the second human 108 may be determined.

A second extraction module 164(2) may utilize information provided by other modules to extract clusters 158. In some implementations semantic segmentation data may be determined that indicates classification data 162 for one or more cells or cubes. For example, the point cloud data 148 and the image data 150 may be processed by a trained neural network or other machine learning system that provides semantic segmentation data for each cell or cube. Continuing the example, a given cube may be designated as {human} or {nonhuman}. The second extraction module 164(2) may use the semantic segmentation data to determine one or more clusters 158 from the input cluster 158. For example, the first cluster 158(1) comprising the table 106 and the human 108 may be separated into a second cluster 158(2) consisting of the cells or cubes having a classification of {nonhuman} that corresponds to the table 106 and a third cluster 158(3) consisting of cells or cubes having a classification of {human}. In some implementations, the clustering module 154 may be utilized to process this data and determine the second cluster 158(2), third cluster 158(3), and so forth. Additional extraction module(s) s 164(P) may be used to process the classification data 162 and determine output as the object data 174. In some implementations, the clusters 158 extracted by the extraction module(s) 164 may be processed by the one or more classification modules 160.

The object data 174 determined by the object module 152 may comprise cluster data 156 indicative of the particular cluster 158 and the classification data 162 indicative of the classification associated with the cluster 158.

The object data 174 may be stored, used by other modules, and so forth. For example, the object data 174 may be provided to the mapping module 142 to determine the occupancy map 144. Clusters 158 that have been determined to contain nonhuman objects 168 such as furniture 106 may be added to the occupancy map 144 used to store information about persistent obstacles. In comparison, clusters 158 that are determined to contain human 108 objects may be added to a map or map layer indicative of the location of the humans 108 in the physical space 102.

The object data 174 may also be used by one or more task modules 178. For example, a videoconferencing task module 178 may use the object data 174 to determine where to point the FOV of a camera 344 used for acquiring data for outgoing video of the videoconference.

Figure 5:
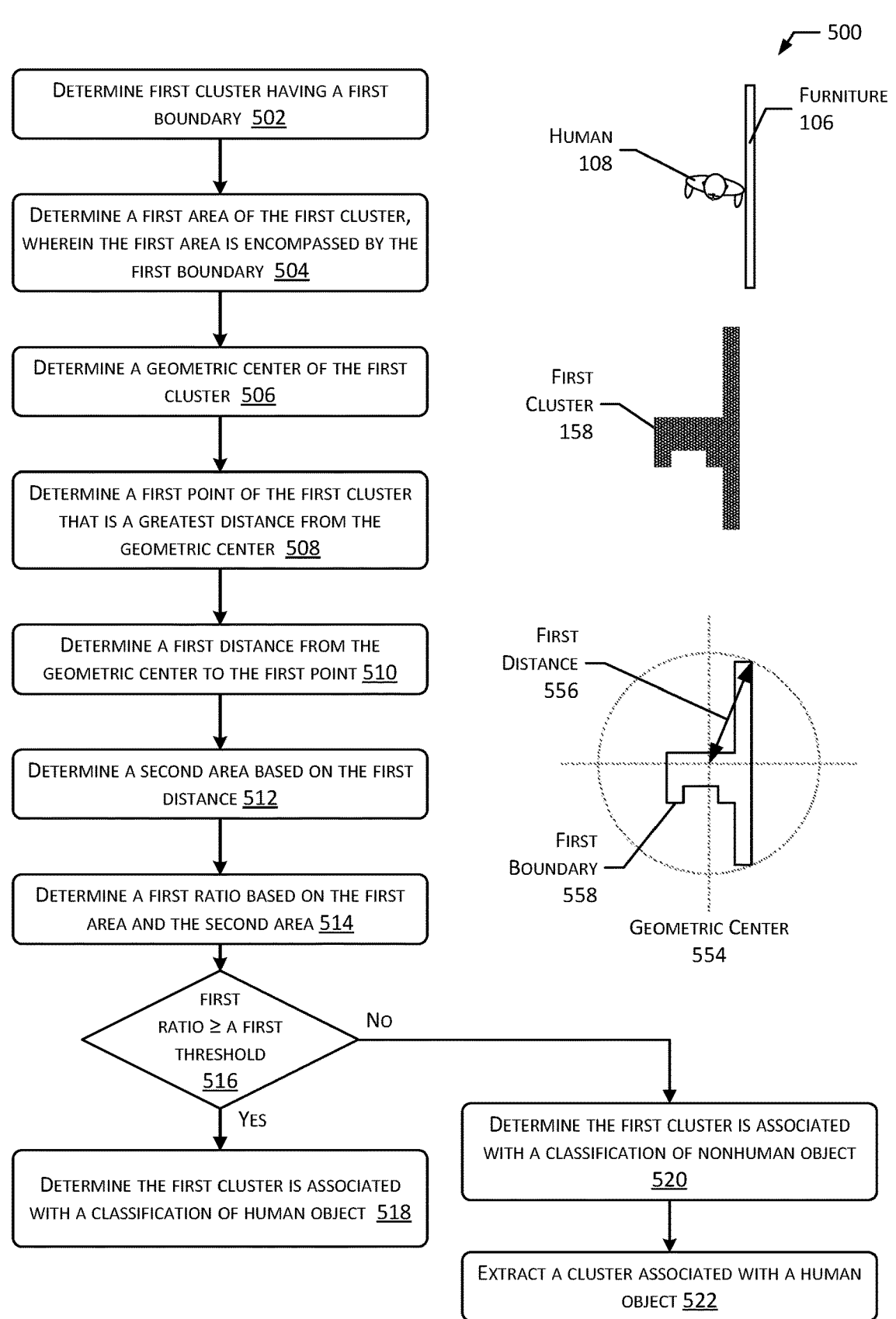
FIG. 5 is a flow diagram of a first implementation of a process for determining classification of an object represented by a cluster.

FIG. 5 is a flow diagram 500 of a first implementation of a process for determining classification of an object represented by a cluster 158. The process may be executed by one or more of the AMD 104, the docking station 182, the servers 184, or other devices 186.

At 502 a first cluster 158 having a first boundary 558 is determined. For example, the first boundary 558 may comprise an outermost or distal portion of cells or cubes that form a perimeter or exterior surface of the first cluster 158.

At 504 a first area of the first cluster is determined. For example, the first area may comprise a total area representative of the area encompassed by or within the first boundary 558. In another example, the first area may comprise a sum of the areas of the individual cells that comprise the first cluster 158.

In another implementation a first volume of the cluster 158 may be determined. For example, the first volume may comprise the sum of the volumes of the individual cubes that comprise the first cluster 158.

At 506 a geometric center 554 of the first cluster 158 is determined. For example, the geometric center 554 may comprise a centroid of the area of a two-dimensional cluster 158 or a centroid of the volume encompassed by a three-dimensional cluster 158.

At 508 a first point of the first cluster 158 is determined that is a greatest, or farthest, distance from the geometric center 554. For example, the first point may comprise a point on the first boundary 558 that is a greatest distance from the geometric center 554.

In other implementations, the first point may be determined that is a least, or shortest, distance from the geometric center 554. For example, the first point may comprise a point on the first boundary 558 that is a least distance from the geometric center 554. In still other implementations, a second point may be determined that is a least distance from the geometric center 554.

At 510 a first distance 556 is determined from the geometric center 554 to the first point. In implementations where a second point is also used, a second distance (not shown) is determined from the geometric center 554 to the second point.

At 512 a second area is determined based on the first distance 556. For example, the second area may comprise a circle centered at the geometric center 554 and having a radius of the first distance 556. In other implementations other shapes may be used. For example, the second area may comprise a square centered at the geometric center 554 and having a length of a side that is twice the first distance 556.

In other implementations, a second volume may be determined based on the first distance 556. For example, the second volume may comprise a sphere centered at the geometric center 554 and having a radius of the first distance 556. In another example, the second volume may comprise a cylinder having an axis at the geometric center 554, a radius of the first distance 556 and a height. In one implementation, the height of the cylinder may be predetermined, such as a fixed value of 2 meters. In another implementation, the height of the cylinder may be based on a height above ground of the uppermost point in the cluster 158.

In implementations where the second point is also used, a third area is determined based on the second distance. For example, the third area may comprise a circle centered at the geometric center 554 and having a radius of the second distance. As mentioned above, in other implementations other shapes may be used.

At 514 a first ratio is determined based on the first area and the second area. This first ratio is representative of a geometric ratio of the first cluster 158. For example, the first ratio may be calculated using the following equation:

$$\text{First ratio} = (\text{first area})/(\text{second area}) \qquad \text{EQUATION 1}$$

In some implementations the first ratio may be determined based on the first volume and a second volume. For example, the first ratio may be calculated using the following equation:

$$\text{First ratio} = (\text{first volume})/(\text{second volume}) \qquad \text{EQUATION 2}$$

In implementations where the second point is also used, a second ratio is determined based on the first area and the third area. This second ratio is representative of another geometric ratio of the first cluster 158.

At 516 a comparison is made to determine if the first ratio is greater than or equal to a first threshold. For example, the first ratio may be calculated as a dimensionless value, such as "0.19". The first threshold may also be a dimensionless value, such as "0.17". If the first ratio is greater than or equal to the first threshold, the process proceeds to 518. If not, the process proceeds to 520. In other implementations, a comparison may be made to determine if the first ratio is within a first range of threshold values.

In some implementations the first threshold may be determined experimentally. For example, samples of experimental data including classification data may be processed to determine the first threshold.

The first threshold may vary based on one or more parameters. These parameters may include one or more of a distance between the AMD 104 and a portion of the first cluster 158, an angle between a center of the sensor FOV 112 and a portion of the first cluster 158, a maximum height of the first cluster 158, sensor accuracy, and so forth.

The first threshold may be retrieved from a previously stored data structure, such as a lookup table. For example, based on a given distance between the AMD 104 and the geometric center 554, a first value of the first threshold may be retrieved from a first lookup table. In another example, based on a relative angle between a center of the FOV 112 and the geometric center 554 a second value of the first threshold may be retrieved from a second lookup table. In yet another example, based on the distance between the AMD 104 and the geometric center 554 and the relative angle between the center of the FOV 112 and the geometric center 554, a third value of the first threshold may be retrieved from a third lookup table.

The one or more parameters may include a height of the first cluster 158. For example, one of the parameters may be a maximum observed height of the first cluster 158. By determining a value of the first threshold based on the maximum observed height of the first cluster 158, the system 100 may provide improved accuracy in properly classifying a child as a human 108.

In some implementations, the first threshold may be calculated based on the one or more parameters. For example, a fourth value of the first threshold may be calculated based on a fixed value, the distance between the AMD 104 and the geometric center 554, and the relative angle between the center of the FOV 112 and the geometric center 554.

In implementations where the second point is also used, a comparison may also be made to determine if the second ratio is greater than or equal to, or less than, a second threshold. The second threshold may be determined as described with regard to the first threshold.

At 518 the first cluster 158 is determined to be associated with a classification of a human object. For example, first classification data 162(1) may indicate a classification of {human}.

At 520 the first cluster 158 is determined to be associated with a classification of a nonhuman object 168. For example, first classification data 162(1) may indicate a classification of {nonhuman}.

As described above, in some situations the nonhuman object 168 may comprise a human object and a nonhuman object 168. In some implementations, at 522 one or more extraction modules 164 may be used to extract one or more additional clusters 158 from the first cluster 158. For example, a second cluster 158(2) associated with a human object may be extracted from a first cluster 158(1).

In some implementations the classification data 162 may include the first ratio, or information based on the first ratio. For example, the classification data 162 may comprise "{classification_value}, {first_ratio_value}".

FIG. 6 is a flow diagram 600 of a second implementation of a process for determining classification of an object represented by a cluster. The process may be executed by one or more of the AMD 104, the docking station 182, the servers 184, or other devices 186.

At 602 a first cluster 158(1) is determined. For example, the clustering module 154 may determine a cluster 158 represented by first cluster data 156. The first cluster 158 may comprise cells or cubes.

At 604 a first location indicative of a human 108 is determined. For example, one or more of the sensor data 146 may be processed to determine coordinates that are indicative of a location of a human 108 in the physical space 102. In one implementation, a trained neural network may be used to process at least a portion of the sensor data 146 and provide as data the first location that is indicative of a human location 166.

In some implementations the first location is located within the first cluster 158(1). For example, if the first location is outside of a boundary of the first cluster 158(1), the process may terminate.

In implementations in which a 2D map is being used, the first location may specify a 2D location with respect to the 2D map. In implementations in which a 3D map is being used, the first location may specify a 3D location with respect to the 3D map.

At 606 a first area 652 is determined that is associated with the first location. In one implementation, the first area 652 may comprise a shape with specified dimensions that has been predetermined. For example, the first area 652 may comprise a circle with a radius of 20 centimeters. The location of the first area 652 with respect to the human location 166 may be predetermined. For example, the first area 652 may be centered on the human location 166. In some implementations, the first area 652 may be determined based on one or more parameters. These parameters may include one or more of a distance between the AMD 104 and a portion of the first cluster 158, an angle between a center of the sensor FOV 112 and a portion of the first cluster 158, a maximum height of the first cluster 158, sensor accuracy, and so forth.

In other implementations, a first volume may be determined based on the first human location 166. For example, the first volume may comprise a cylinder having an axis at the human location 166 and having a radius and height. In one implementation, one or more of the height or the radius of the cylinder may be predetermined. In another implementation, the height of the cylinder may be based on a height above ground of the uppermost point in the cluster 158.

At 608 a second ratio is determined based on a portion of the first area 652 that overlaps the first cluster 158(1). For example, the overlap may comprise the set of cells in the first area 652 that represent the same portion of the physical space 102 as the cells in the first cluster 158(1). The second ratio may comprise a dimensionless value.

For example, the second ratio may be calculated using the following equation:

$$\text{Second ratio} = (\text{overlapping area}) / (\text{cluster area}) \qquad \text{EQUATION 3}$$

In implementations using cubes or other 3D data, the second ratio may be determined based on a portion of the first volume of the first cluster 158(1) that is coincident with a second volume of the first cluster 158(1). For example, the set of cubes of the first volume that represent the same portion of the physical space 102 as the first cluster 158(1). For example, the second ratio may be calculated using the following equation:

$$\text{Second ratio} = (\text{coincident volume}) / (\text{second volume}) \qquad \text{EQUATION 4}$$

At 610 a comparison is made to determine if the second ratio is greater than or equal to a second threshold. The second threshold may also comprise a dimensionless value.

If the second ratio is greater than or equal to the second threshold, the process proceeds to 612. If not, the process proceeds to 614.

The second threshold may be determined using various techniques, such as those described herein. In some implementations the second threshold may vary based on one or more parameters. For example, a value of the second threshold may be determined based on one or more of distance, relative angle, height, and so forth.

In other implementations, a comparison may be made to determine if the second ratio is within a second range of threshold values.

At 612 the first cluster 158(1) is determined to be associated with a classification of a human object. For example, first classification data 162(1) may indicate a classification of {human}.

At 614 the first cluster 158(1) is determined to be associated with a classification of a nonhuman object 168. For example, first classification data 162(1) may indicate a classification of {nonhuman}.

As described above, in some situations the nonhuman object 168 may comprise a human object and a nonhuman object 168. In some implementations, at 616 one or more extraction modules 164 may be used to extract one or more additional clusters 158 from the first cluster 158(1). For example, a second cluster 158(2) associated with a human object may be extracted from a first cluster 158(1).

In some implementations the classification data 162 may include the second ratio, or information based on the second ratio. For example, the classification data 162 may comprise "{classification_value}, {second_ratio_value}".

Figure 7:
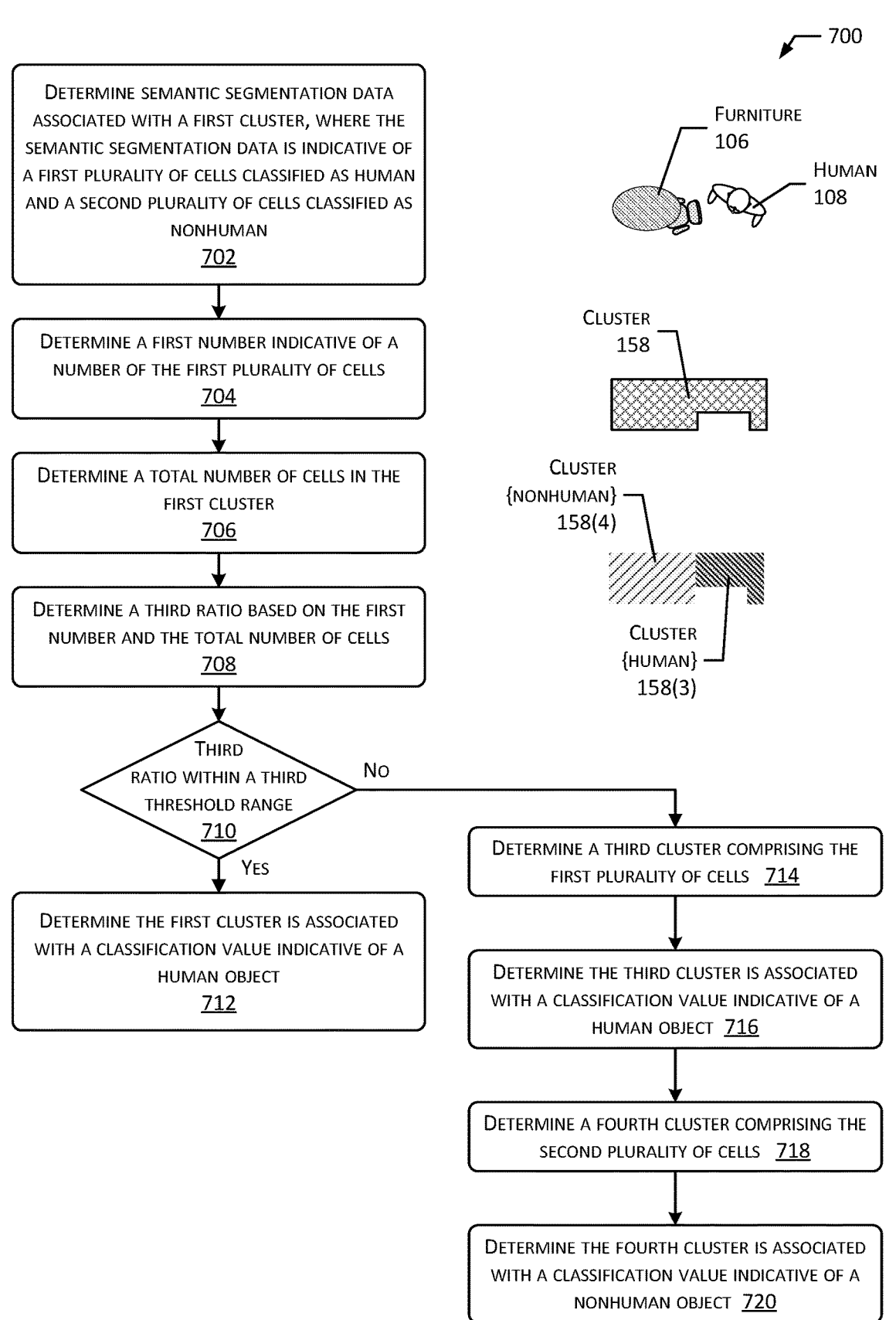
FIG. 7 is a flow diagram of a third implementation of a process for determining classification of an object represented by a cluster.

FIG. 7 is a flow diagram 700 of a third implementation of a process for determining classification of an object represented by a cluster 158. The process may be executed by one or more of the AMD 104, the docking station 182, the servers 184, or other devices 186.

At 702 semantic segmentation data associated with a first cluster 158(1) is determined. For example, the semantic segmentation data may comprise data produced by a trained machine learning system that associates semantic data with individual ones of the cells or cubes. Continuing the example, the semantic segmentation data may comprise values that indicate if a particular cell or cube is classified as {human} or {nonhuman}. The semantic segmentation data is indicative of a first plurality of cells or cubes that are classified as {human} and a second plurality of cells or cubes that are classified as {nonhuman}.

The semantic segmentation data is determined based on at least a portion of the sensor data 146. For example, the image data 150 may be processed with a trained neural network to determine whether particular pixels in the image data 150 are classified as {human} or {nonhuman}. In some implementations the data produced by semantic segmentation is "noisy" or subject to relatively high levels of erroneous classification.

During operation to determine the semantic segmentation data, the classification data 162 may be stored as an index value or index entry that is associated with the cluster data 156. For example, each of the cells or cubes within a cluster 158 may include an associated index value that specifies the classification of that particular cell or cube.

At 704 a first number indicative of a number of the first plurality of cells is determined. For example, the first number comprises a sum of the index values that are indicative of a classification of {human}. In another example in which index values are issued sequentially, the first number may comprise the greatest or largest index value.

At 706 a total number of cells or cubes in the first cluster 158(1) is determined.

At 708 a third ratio is determined based on first number and the total number of cells or cubes. For example, the third ratio may be calculated using the following equation:

$$\text{Third ratio}=(\text{first number})/(\text{total number of cells or cubes}) \qquad \text{EQUATION 5}$$

At 710 a comparison is made to determine if the third ratio is within a third threshold range. Values of the endpoints of the third threshold range may comprise dimensionless values. If yes, the process proceeds to 712. If not, the process proceeds to 714. In other implementations, other comparisons may be used. For example, a determination may be made as to whether the third ratio is greater than or equal to a third threshold.

The values of the endpoints of the third threshold range may be determined using various techniques, such as those described herein. In some implementations the third threshold range may vary based on one or more parameters. For example, values of the endpoints of the third threshold range may be determined based on one or more of distance, relative angle, height, and so forth.

At 712 the first cluster 158(1) is determined to be associated with a classification of a human 108 object. For example, first classification data 162(1) may indicate a classification of {human}.

At 714 a third cluster 158(3) is determined based on the first plurality of cells or cubes. For example, the third cluster 158(3) may comprise the cells or cubes that the semantic segmentation data indicates are associated with a classification of {human}.

At 716 the third cluster 158(3) is associated with the classification value indicative of a human 108 object, a classification of {human}.

At 718 a fourth cluster 158(4) is determined based on the second plurality of cells or cubes. For example, the fourth cluster 158(4) may comprise the cells or cubes that the semantic segmentation data indicates are associated with a classification of {nonhuman}.

At 720 the fourth cluster 158(4) is associated with the classification value indicative of a nonhuman object 168, a classification of {nonhuman}.

As described above, in some situations the nonhuman object 168 may comprise a human 108 object and a nonhuman object 168. In some implementations, the clusters 158 resulting from the semantic segmentation data may be processed by one or more of the classification modules 160 or the extraction modules 164. This additional processing may be used to confirm or increase the confidence in the respective classifications.

In some implementations, the classification data 162 may include the third ratio, or information based on the third ratio. For example, the classification data 162 may comprise "{classification_value}, {third_ratio_value}".

In other implementations the techniques used herein may be used to determine other classifications. For example, based on the ratio thresholds, the system 100 may be used to classify a pet, other autonomous vehicle, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EE-PROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) located in a physical space, the AMD comprising:

one or more sensors;

one or more processors; and one or more memories storing computer-executable instructions which, when executed using the one or more processors, cause the AMD to:

determine, using the one or more sensors, sensor data indicative of one or more objects within the physical space;

determine, based on the sensor data, cluster data indicative of at least a first cluster representative of a first volume within the physical space that includes at least one object of the one or more objects;

determine a geometric center of the first cluster;

determine a first distance from the geometric center to a point on the first cluster;

determine a second volume based on the first distance;

determine a first ratio based on the first volume and the second volume; and determine, based on a comparison of the first ratio to a first threshold, first classification data that is associated with at least a portion of the first cluster and is indicative of the at least one object.

2. The AMD of claim 1, wherein the one or more memories store computer-executable instructions which, when executed using the one or more processors, cause the AMD to:

determine a first boundary of the first cluster;

determine a first point on the first boundary, wherein the first point is a farthest point from the geometric center;

determine a second point on the first boundary, wherein the second point is a nearest point to the geometric center; and wherein the point on the first cluster is one of the first point on the first boundary or the second point on the first boundary.

3. The AMD of claim 1, wherein the first cluster comprises a plurality of cells that are one or more of: adjacent to, or within a threshold distance of, one another, and further wherein each cell is representative of a particular area within the physical space.

4. The AMD of claim 1, wherein the one or more memories store computer-executable instructions which, when executed using the one or more processors, cause the AMD to:

determine a first area associated with the first cluster;

determine, based on the sensor data, a first location indicative of a human in the physical space, wherein the first location is within the first cluster;

determine a second area that is associated with the first location;

determine a second ratio based on a portion of the second area that overlaps the first area; and determine, based on a comparison of the second ratio to a second threshold, second classification data.

5. The AMD of claim 1, wherein the first cluster comprises a plurality of cells with each cell representative of a particular area within the physical space; and the one or more memories store computer-executable instructions which, when executed using the one or more processors, cause the AMD to:

determine, based on the sensor data, semantic segmentation data that is indicative of:

a first plurality of cells of the first cluster that are classified as including at least a portion of a human, and a second plurality of cells that are classified as not including at least a portion of a human;

determine a first number of cells in the first plurality of cells;

determine a total number of cells in the first cluster;

determine a second ratio based on the first number of cells and the total number of cells; and determine, based on a comparison of the second ratio to a second threshold, second classification data.

6. The AMD of claim 5, wherein the one or more memories store computer-executable instructions which, when executed using the one or more processors, cause the AMD to:

responsive to the second ratio being greater than or equal to the second threshold:

determine a second cluster comprising the first plurality of cells, wherein the second classification data associates the second cluster with a human, and determine a third cluster comprising the second plurality of cells, wherein the second classification data associates the third cluster with a nonhuman.

7. The AMD of claim 1, wherein the one or more memories store computer-executable instructions which, when executed using the one or more processors, cause the AMD to:

determine object data based on the first classification data; and perform one or more operations based on the object data.

8. A method comprising:

acquiring sensor data using one or more sensors on an autonomous mobile device (AMD) in a physical space;

determining, based on the sensor data, first cluster data representative of a portion of the physical space that includes at least one object;

determining, based on the sensor data, a first location indicative of a human in the physical space, wherein the first location is within the portion of the physical space that includes the at least one object;

determining a first volume that is associated with the first location;

determining a first ratio based on a portion of the first volume that overlaps the portion of the physical space that includes the at least one object; and determining, based on a comparison of the first ratio to a first threshold, first classification data that is associated with the portion of the physical space.

9. The method of claim 8, the determining the first cluster data comprising:

determining a plurality of cells, wherein each cell is representative of a particular portion of the physical space that includes at least a portion of the at least one object, that are one or more of: adjacent to, or within a threshold distance of, one another.

10. The method of claim 8, further comprising:

determining a first area of the portion of the physical space;

determining a geometric center of the portion of the physical space;

determining a first distance from the geometric center to a first point, wherein the first point is at a greatest distance from the geometric center;

determining a second area based on the first distance;

determining a second ratio based on the first area and the second area; and determining, based on a comparison of the second ratio to a second threshold, second classification data.

11. The method of claim 8, further comprising:

determining a second volume of the portion of the physical space that includes the at least one object;

determining a geometric center of the portion of the physical space that includes the at least one object;

determining a first point of the portion of the physical space that includes the at least one object that is a greatest distance from the geometric center;

determining a first set of distances from the geometric center to the first point;

determining a third volume based on the first set of distances;

determining a second ratio based on the second volume and the third volume; and determining, based on a comparison of the second ratio to a second threshold, second classification data.

12. The method of claim 8, further comprising:

determining a first area that is associated with the first location;

determining a second ratio based on a portion of the first area that overlaps the portion of the physical space that includes the at least one object; and determining, based on a comparison of the second ratio to a second threshold, second classification data.

13. The method of claim 8, further comprising:

determining, based on the sensor data, semantic segmentation data that is indicative of:

a first plurality of cells of the portion of the physical space that are classified as containing at least a portion of a human, and a second plurality of cells that are classified as not containing at least a portion of a human;

determining a first number of cells in the first plurality of cells;

determining a total number of cells in the portion of the physical space;

determining a second ratio based on the first number of cells and the total number of cells; and determining, based on a comparison of the second ratio to a second threshold, second classification data.

14. The method of claim 8, further comprising:

determining that the portion of the physical space is associated with a classification value indicative of a human object, if the first ratio is greater than or equal to the first threshold; and determining that the portion of the physical space is associated with a classification value indicative of a nonhuman object, if the first ratio is less than the first threshold.

15. The method of claim 8, further comprising:

determining object data based on the first classification data; and performing one or more operations based on the object data.

16. An autonomous mobile device (AMD) located in a physical space, the AMD comprising:

one or more sensors;

one or more processors; and one or more memories storing computer-executable instructions which, when executed using the one or more processors, cause the AMD to:

determine, using the one or more sensors, sensor data indicative of one or more objects within the physical space;

determine, based on the sensor data, first cluster data representative of a portion of the physical space that includes at least one object of the one or more objects;

determine, based on the sensor data, semantic segmentation data that is indicative of:

a first plurality of cubes in the portion of the physical space that are classified as containing at least a portion of a human, and a second plurality of cubes in the portion of the physical space that are classified as not containing at least a portion of a human;

determine a first number of cubes in the first plurality of cubes;

determine a total number of cubes in the portion of the physical space;

determine a first ratio based on the first number of cubes and the total number of cubes;

determine, based on a comparison of the first ratio to a first threshold, first classification data that is associated with the at least the portion of the physical space that includes the at least one object;

determine confidence data associated with the first classification data; and confirm or increase the confidence data associated with the first classification data by performing a second type of classification process using the first cluster data, wherein the performing the second type of classification process involves;

determining, based on the sensor data, a first location indicative of a human in the physical space, wherein the first location is within the portion of the physical space that includes the at least one object, determining a first volume that is associated with the first location, determining a second ratio based on a portion of the first volume that overlaps the portion of the physical space that includes the at least one object, and determining, based on a comparison of the second ratio to a second threshold, second classification data.

17. The AMD of claim 16, wherein the first cluster data is representative of a third plurality of cubes that are one or more of: adjacent to, or within a threshold distance of one another, and further wherein each cube of the third plurality of cubes is representative of a particular portion of the physical space.

18. The AMD of claim 16, wherein the one or more memories store computer-executable instructions which, when executed using the one or more processors, cause the AMD to:

determine that the portion of the physical space is associated with a classification value indicative of a human object, if the first ratio is greater than or equal to the first threshold; and determine that the portion of the physical space is associated with a classification value indicative of a human object and a classification value indicative of a nonhuman object, if the first ratio is less than the first threshold.

19. The AMD of claim 16, wherein the one or more memories store computer-executable instructions which, when executed using the one or more processors, cause the AMD to:

determine object data based on the second classification data; and perform one or more operations based on the object data.

20. The AMD of claim 16, wherein the one or more memories store computer-executable instructions which, when executed using the one or more processors, cause the AMD to:

determine that the portion of the physical space is associated with a classification value indicative of a human object, if the second ratio is greater than or equal to the second threshold; and determine that the first cluster data is associated with a classification value indicative of a nonhuman object, if the second ratio is less than the second threshold.

\* \* \* \* \*